(12) United States Patent
Lin et al.

(10) Patent No.: US 9,255,944 B1
(45) Date of Patent: Feb. 9, 2016

(54) TIP STRUCTURE OF PLATINUM-PLATINUM SILICIDE-SILICON COMPOSITE FIELD SENSOR PROBE AND METHOD FOR FORMING MSTA STRUCUTRE ON THE PROBE

(71) Applicant: National Applied Research Laboratories, Taipei (TW)

(72) Inventors: Chun-Ting Lin, Hsinchu (TW);
Ming-Hua Shiao, Hsinchu (TW);
Shu-Hung Tung, Taichung (TW);
Mao-Nan Chang, Taichung (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 0 days.

(21) Appl. No.: 14/665,121

(22) Filed: Mar. 23, 2015

(51) Int. Cl.
*G01Q 70/14* (2010.01)
*G01Q 70/18* (2010.01)

(52) U.S. Cl.
CPC ............ *G01Q 70/18* (2013.01); *G01Q 70/14* (2013.01)

(58) Field of Classification Search
CPC .............................. G01Q 70/18; G01Q 70/14
USPC .............................................. 850/56, 59–61
See application file for complete search history.

(56) References Cited

U.S. PATENT DOCUMENTS

| | | | | |
|---|---|---|---|---|
| 8,332,961 | B2 * | 12/2012 | Bhaskaran | G01Q 60/40 850/1 |
| 2014/0193585 | A1 * | 7/2014 | Lin | C23C 18/54 427/383.3 |
| 2015/0118834 | A1 * | 4/2015 | Loh | H01L 21/2258 438/559 |

FOREIGN PATENT DOCUMENTS

JP      2012109503 A  *  6/2012

* cited by examiner

*Primary Examiner* — Michael Maskell
(74) *Attorney, Agent, or Firm* — Jackson IPG PLLC; Demian K. Jackson (57) ABSTRACT

A platinum-platinum silicide modified silicon composite tip apex, and a method for forming the aforesaid tip apex are disclosed, where a metallic precursor solution and a silicon probe are reacted to form a local platinum nano-structure, which could be precisely controlled with local selectivity, and a local platinum silicide layer is formed between the platinum nano-structure and the silicon probe with an atmospheric microwave annealing (a-MWA) process conducted as well, largely enhancing the conductivity of the tip and spatial resolution of the field detection in field sensitive scanning probe microscopy. In addition to exemption from a stray-field effect and thus having better image quality, the platinum silicide-containing probe could more efficiently enhance the interfacial electron transfer efficiency as compared to the probe tip having only a platinum nano-structure, so that the probe could be applicable to a controlled conductive probe having high spatial resolution.

9 Claims, 6 Drawing Sheets

TIP STRUCTURE OF PLATINUM-PLATINUM SILICIDE-SILICON COMPOSITE FIELD SENSOR PROBE AND METHOD FOR FORMING MSTA STRUCUTRE ON THE PROBE

FIELD OF THE INVENTION

The present invention relates to a tip structure of a platinum-platinum silicide-silicon composite field sensor probe used for field detection, and a method for forming a modified silicon tip apex structure (MSTA) on the probe, and particularly to such structure and method where a chemical deposition process is combined with a microwave annealing process, so as to form a local platinum silicide layer between the platinum nano-structure and the silicon probe tip, and more particularly to such structure and method equipped with a good spatial resolution and sensitivity, which may largely enhancing a conductivity of the tip and a spatial resolution of the field detection.

DESCRIPTION OF THE RELATED ART

In study of material used for a tip, it is the first issue to focus on the measurement of the optical, electrical, magnetic and mechanical properties of the tip in a nano-level. The Field sensitive scanning probe microscopic technology (FS-SPM) may include electric forcemicroscopy (EFM), magnetic force microscope (MFM), scanning Kelvin Probe Microscopy (SKPM), etc. Although they may present the properties of the material such as a local surface potential, an electric field, and a magnetic field, the properties measured for the nano-level are limited by the spatial resolution. Generally, the spatial resolution and sensitivity of the FS-SPM are closely related to a geometrical profile and size of the tip. Further, the conventional FS-SPM is composed of the atomic force microscope (AFM) with a conductive metallic film coated on a tip portion thereof. Since the tip has an exceedingly large field detection cross-section, the stray-field effect (SFE) may not be avoided. To reduce the SFE, many methods for forming a modified silicon tip apex (MSTA) have been proposed, which are briefly introduced as follows. Prior art a method for forming a modified silicon tip apex using an etching manner to manufacture its tip nano-line having a high feature ratio. U.S. Pat. No. 5,171,992, disclosed a technology of depositing a high feature ratio nano-structure on a carbon substrate by using an ion beam as a promotion for the deposition. European patent, EP1,744,143 disclosed a technology for growing a nano-line by focusing an electron beam onto the probe tip. However, the above cited technologies with the energy beam or dry etch basis require a rigorous vacuum equipment, imposing a challenge to a mass production. On the other hand, the wet chemical manufacturing involves a relatively lower cost and the advantage of mass production in forming the modified silicon tip apex. This may be found, for example, in "The Manufacturing of a Metallic Nano-Cluster at a Tip Apex for Field-Sensitive Microscopy Applications," Journal of Nanoscience and Nanotechnology, vol. 10, pp. 4459-4464, 2010, which was set forth by H. M. Lin, M.-N. Chang, Y.-S. Lin, and C.-C. Cheng. In this thesis, a nano-particles tip is presented to reduce the SFE. This process was granted as the Taiwan patent, 1287089. Other electro-deposition based chemical modifying methods may be seen in such as U.S. Pat. No. 7,955,486 and U.S. Pat. No. 7,507,320, where the metal modifying result requires a voltage to be applied on the tip.

Prior art C.-T. Lin et. al. suggested an electro-coating free technology in a fluorine ions environment in achieving in a deposition of a metallic nano-structure on a silicon probe tip. However, the issue of a low transmission efficiency of the electrons between the metal and the silicon probe is all encountered in the electro-coating, the electro-coating free and the electron beam induced deposition (EBID), adversely affecting a field detection efficiency.

Methods for improving the conductive tips by using a metal silicide have been proposed in the literature. For example, U.S. Pat. No. 6,139,759 and U.S. Pat. No. 6,198,300, assigned to IBM, both proposed a $TiSi_2$ tip, where an exceedingly field detection is involved, resulting in a stray-field. In addition, examples still may be found in other patents. In U.S. Pat. No. 8,332,961, IBM proposed a PtSi tip structure, and in U.S. Pat. No. 7,142,449, HP suggested a metal silicide reader head. However, the prior art forms the metal silicide mostly by using an annealing process in the conventional furnace tube, and hence an overall heating policy has a large effect on the overall nano-level device and only few local tip annealing report may be seen. Although the inventor of this patent application has proposed a technology for forming the modified silicon tip apex by Ag along with a microwave annealing process to enhance the field detection ability in 2013, Ag is apt to be vulcanized or oxidized in an ambient environment, badly affecting a lifetime of the probe and further imposing an unfavorable effect on actual applications in the semiconductor industry. Therefore, the prior art may not meet the requirement of the actual use.

SUMMARY OF THE INVENTION

It is a main and the other objects of the present invention to provide a tip structure of a platinum-platinum silicide-silicon composite field sensor probe, and a method for forming a modified silicon tip apex (MSTA) structure on the probe, respectively, where a chemical deposition method is used in combination with a microwave annealing process so that a local platinum silicide layer is formed between a platinum nano-structure and a silicon probe tip with a good spatial resolution and sensitivity, which may largely enhance a tip conductivity and a field sensor spatial resolution.

According to the present invention, the tip structure of a platinum-platinum silicide-silicon composite field sensor probe comprises a silicon probe tip; a platinum nano-structure, growing on the silicon probe tip; and a local platinum silicide layer, disposed between the silicon probe tip and the platinum nano-structure to increase a tip field sensor resolution ability.

In an embodiment nano-structure has a particle diameter ranging between 25 nm and 35 nm.

According to the present invention, the method for forming a modified silicon tip apex structure on the probe, comprising steps of (a) depositing a platinum nano-structure on a silicon probe tip; and (b) heating the silicon probe by a micro-wave, so that a local platinum silicide layer is formed between the platinum nano-structure and the silicon probe tip.

In an embodiment, step (a) further comprises steps of (a1) providing a metallic precursor solution mixed with fluorine ions; and (a2) controlling the silicon probe tip to be locally scanned on a substrate containing the metallic precursor solution, so as to restore a metal in the metallic precursor solution onto the silicon probe tip, and limit a size of the modified metal by using a particular surface structure of the substrate.

In an embodiment, step (b) is performed by heating the silicon probe by the micro-wave under 1 atm to experience an atmospheric microwave annealing (a-MWA) process.

In an embodiment, step (b) is performed with a power of between 500 W and 1,800 W for a time between 60 seconds and 120 seconds.

In an embodiment, step (b) is performed by heating the silicon probe by the micro-wave with an intermission.

In an embodiment, step (b) is performed by heating the silicon probe by the micro-wave in a single fragmentation.

In an embodiment, the substrate has a plurality of holes for carrying the metallic precursor solution.

In an embodiment, the metallic precursor solution is composed of $H_2PtCl_6$ and a buffered oxide etchant (BOE).

In an embodiment, step (a2) is scanned for 5 seconds to 10 seconds in a tapping mode.

In an embodiment, step (a2) is performed by a localized fluoride assisted galvanic replacement reaction (LFAGRR) process.

BRIEF DESCRIPTIONS OF THE DRAWINGS

The present invention will be better understood from the following detailed descriptions of the preferred embodiments according to the present invention, taken in conjunction with the accompanying drawings, in which.

silicon probe 1
tip 11
platinum nano-structure 12
local platinum silicide layer 13
substrate 2
hole 21
metallic precursor solution 3
microwave furnace 4
S111
    providing a metallic precursor solution mixed with fluorine ions; and
S112
    controlling the silicon probe tip to be locally scanned on a substrate containing the metallic precursor solution, so as to restore a metal in the metallic precursor solution onto the silicon probe tip, and limit a size of the modified metal by using a particular surface structure of the substrate.
S11
    depositing a platinum nano-structure on a silicon probe tip; and
S12
    heating the silicon probe by a micro-wave, so that a local platinum silicide layer is formed between the platinum nano-structure and the silicon probe tip.

DESCRIPTION OF THE PREFERRED EMBODIMENTS

It is a main and the other objects of the present invention to provide a tip structure of a platinum-platinum silicide-silicon composite field sensor probe, and a method for forming a modified silicon tip apex (MSTA) structure on the probe, respectively, where a chemical deposition method is used in combination with a microwave annealing process so that a local platinum silicide layer is formed between a platinum nano-structure and a silicon probe tip with a good spatial resolution and sensitivity, which may largely enhance a tip conductivity and a field sensor spaciancel resolution.

According to the present invention, the tip structure of a platinum-platinum silicide-silicon composite field sensor probe comprises a silicon probe tip; a platinum nano-structure, growing on the silicon probe tip; and a local platinum silicide layer, disposed between the silicon probe tip and the platinum nano-structure to increase a tip field sensor resolution ability.

In an embodiment, the platinum nano-structure has a particle diameter ranging between 25 nm and 35 nm.

According to the present invention, the method for forming a modified silicon tip apex structure on the probe, comprising steps of (a) depositing a platinum nano-structure on a silicon probe tip; and (b) heating the silicon probe by a micro-wave, so that a local platinum silicide layer is formed between the platinum nano-structure and the silicon probe tip.

In an embodiment, step (a) further comprises steps of (a1) providing a metallic precursor solution mixed with fluorine ions; and (a2) controlling the silicon probe tip to be locally scanned on a substrate containing the metallic precursor solution, so as to restore a metal in the metallic precursor solution onto the silicon probe tip, and limit a size of the modified metal by using a particular surface structure of the substrate.

In embodiment, step (b) is performed by heating the silicon probe by the micro-wave under 1 atm to experience an atmospheric microwave annealing (a-MWA) process.

In an embodiment, step (b) is performed with a power of between 500 W and 1,800 W for a time between 60 seconds and 120 seconds.

In an embodiment, step (b) is performed by heating the silicon probe by the micro-wave with an intermission.

In an embodiment, step (b) is performed by heating the silicon probe by the micro-wave in a single fragmentation.

In an embodiment, the substrate has a plurality of holes for carrying the metallic precursor solution.

In an embodiment, the metallic precursor solution is composed of $H_2PtCl_6$ and a buffered oxide etchant (BOE).

In an embodiment, step (a2) is scanned for 5 seconds to 10 seconds in a tapping mode.

In an embodiment, step (a2) is performed by a localized fluoride assisted galvanic replacement reaction (LFAGRR) process.

Referring to FIG. 1 through FIG. 6, a process flowchart illustrating a method for forming a modified silicon tip apex (MSTA) structure according to the present invention, a process flowchart for illustrating how to deposit a platinum nano-structure on the silicon probe tip according to the present invention, a schematic diagram illustrating the method for forming the MSTA on the probe according to the present invention, a structural diagram of the probe tip before a microwave annealing process is introduced according to the present invention, a TEM diffraction diagram of an interface between silicon and platinum after the microwave annealing process according to the present invention, and a schematic diagram illustrating a comparison of a field detection ability among other probes and the probe according to the present invention are shown, respectively, for illustration of the present invention.

As shown, the present invention involves a tip structure of a platinum-platinum silicide-silicon composite field sensor probe, and a method for forming a modified silicon tip apex (MSTA) structure composed of the composite, respectively.

Figure 1:
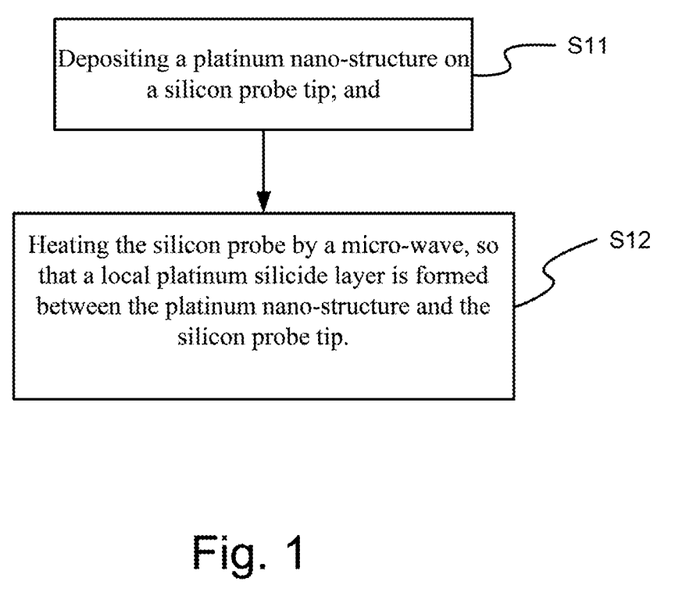
FIG. 1 is a process flowchart illustrating a method for forming a modified silicon tip apex structure (MSTA) according to the present invention.
Figure 2:
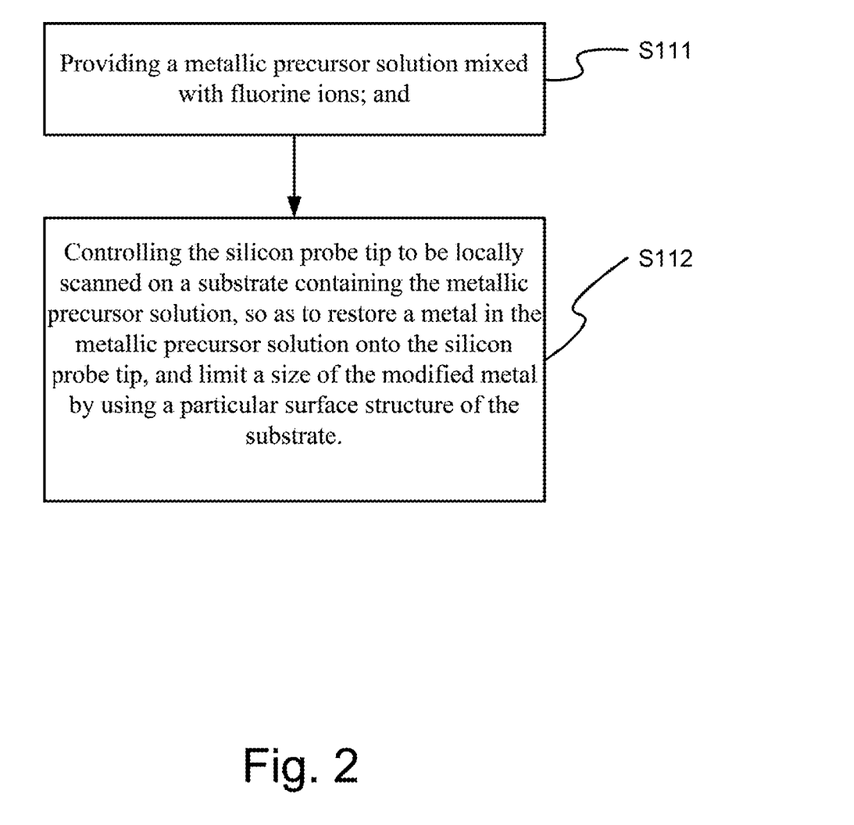
FIG. 2 is a process flowchart for illustrating how to deposit a platinum nano-structure on the silicon probe tip according to the present invention.
Figure 3:
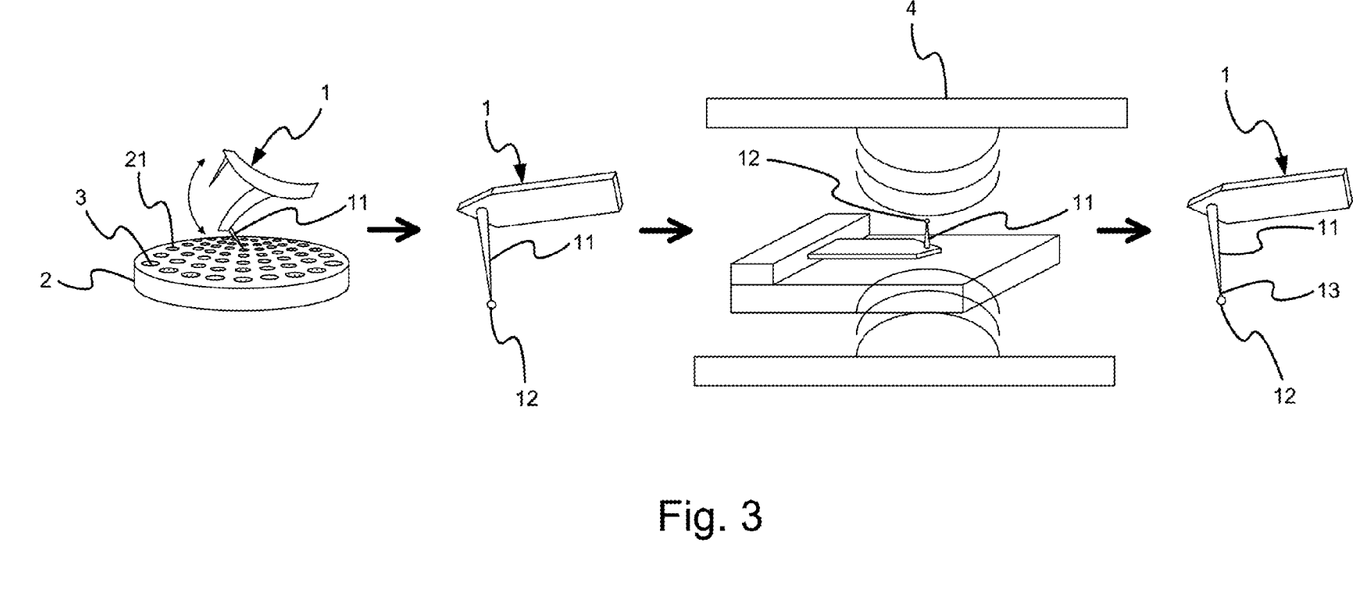
FIG. 3 is a schematic diagram illustrating the method for forming the MSTA on the probe according to the present invention.

An atmospheric microwave annealing (a-MWA) process is employed to form a local platinum silicide layer (Pt—Si) 13 between a tip 11 of a silicon probe 1 and a platinum nano-structure 12 to serve as a modified silicon tip apex (MSTA), and whose manufacturing process is illustrated in FIG. 1 through FIG. 3.

At first, step S11 is performed, where the platinum nano-structure 12 is deposited on the tip 11 of the silicon probe 1, and the platinum-nano-structure 12 has a particle diameter ranging between 25 nm and 35 nm.

In the above step S11, a sub-step S111 is further comprised. Within a plurality of holes 21 on a substrate 2, a metallic precursor solution 3 is provided to mix with fluorine ions. Thereafter, another sub-step S112 is undertaken, where the tip 11 of the silicon probe 1 is controlled to scan on the substrate 2 containing the metallic precursor solution 3 within a limited range for 5 seconds to 10 seconds in a tapping mode.

By means of the above sub-steps S111 and S112, a metal component is restored on the tip 11 of the silicon probe 1, and a size of the metal is modified and thus obtained by setting a surface structure of the substrate 2 as a limit. Specifically, the substrate 2 is Aluminum oxide, and the metallic precursor solution 3 carried within the holes 21 of the substrate 2 is composed of $H_2PtCl_6$ and a buffered oxide etchant (BOE).

Finally, step S12 is performed, where the silicon probe 1 is placed in a microwave furnace 4, and thus heated by a microwave with a power of 500 W to 1,800 W for a time of 60 seconds to 120 seconds, so that a local platinum silicide layer 13 is formed between the platinum nano-structure 12 and the tip 11 of the silicon probe 1, so as to enhance the field detection resolution ability of the tip 11 of the silicon tip 1. In this step, the microwave heating may be implemented by microwave heating in several fragmentations or in a single fragmentation. In this manner, the novel tip structure of a platinum-platinum silicide-silicon composite field sensor probe, and the novel method for forming a MSTA structure are obtained, respectively, in this invention.

Figure 4:
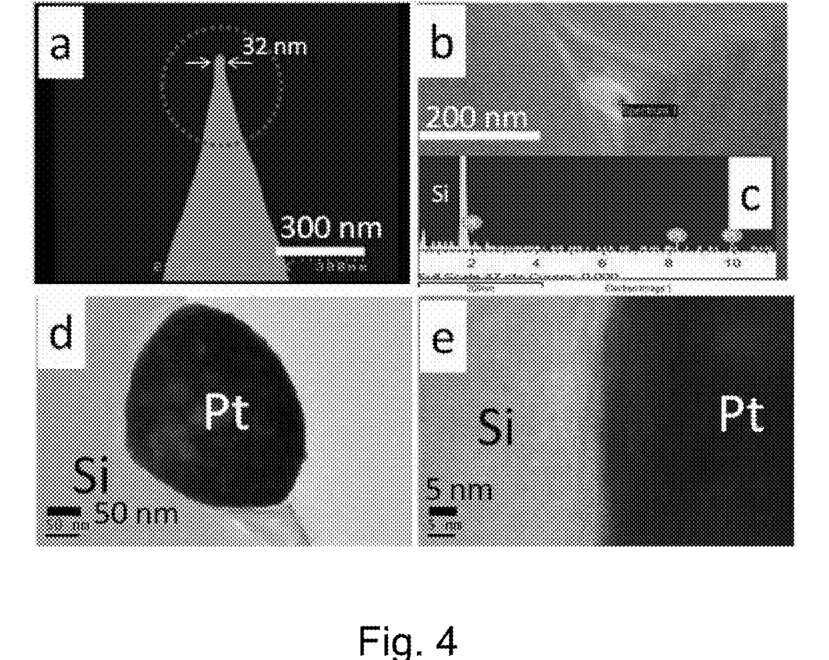
FIG. 4 is a structural diagram of the probe tip before a microwave annealing process is introduced according to the present invention.
Figure 5:
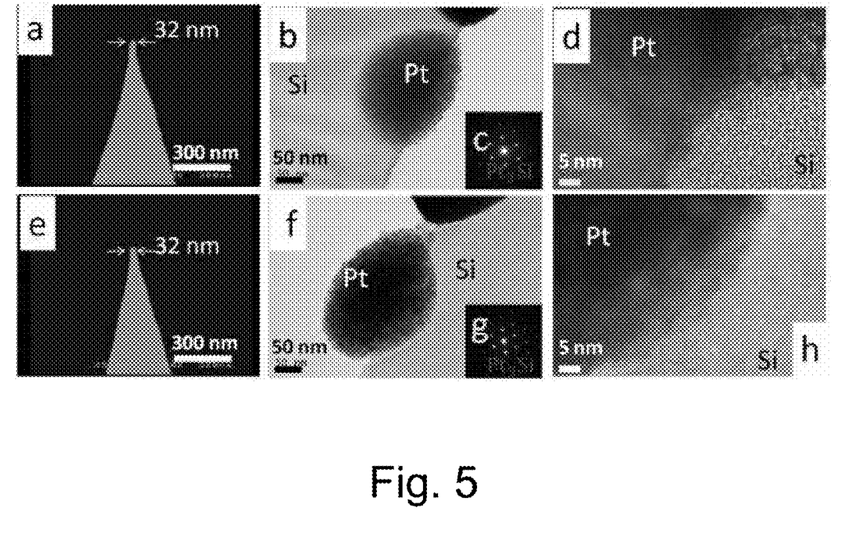
FIG. 5 is a TEM diffraction diagram of an interface between silicon and platinum after the microwave annealing process according to the present invention.

In a preferred embodiment, a 16% buffered oxide etchant and a 0.01 M $H_2PtCl_6$ are mixed as the metallic precursor solution 3. At a room temperature 22° C., an n-type silicon probe 1 is enabled to react with the precursor solution 3 in a half-contact, i.e. tapping, mode, with a deposition time of 300 seconds, to complete the MSTA structure of platinum nano-structure for the silicon probe, having a size of 32 nanometers. As shown in FIG. 4, figures (a) and (b) represent SEM diagrams of the silicon probe tip having been modified by the platinum nano-structure, figure (c) represents an EDS analysis corresponding to figure (c), figures (d) and (e) represent TEM diagrams of the platinum nano-structure growing on a silicon plane under a localized fluoride assisted Galvanic replacement reaction (LFAGR), which has the reaction formula:

It may be known that platinum is shown by measurements undertaken by different equipments before the microwave is applied, and thus it is evidenced that a platinum nano-structure is grown on the silicon probe tip. Thereafter, the silicon probe tip having the platinum nano-structure grown thereon is placed within the microwave furnace 4 for an atmospheric annealing under the conditions of a power of 1,800 W for a time of 60 seconds to 90 seconds. Then, the local platinum silicide layer is obtained. As shown in FIG. 5, figures (a) and (e) are SEM diagrams of the silicon probe tip having been modified with the local platinum nano-structure, figures (b), (d), (f) and (h) are TEM diagrams of the silicon probe tip having been modified with the local platinum silicide layer, while figures (c) and (g) are selected area diffraction (SAD) diagrams obtained from figures (b) and (f)

In the above case, figures (a) through (d) and figures (e) through (h) have their atmospheric microwave annealing time of 60 seconds and 90 seconds, respectively. Hence, figures (a) through (h) in FIG. 5 all show that the platinum nano-structure still exists after being placed into the microwave furnace for annealing, forming the local platinum silicide (Pt—Si). It may be thus evidenced that a local platinum silicide layer is formed between the platinum nano-structure and the silicon probe tip.

Figure 6:
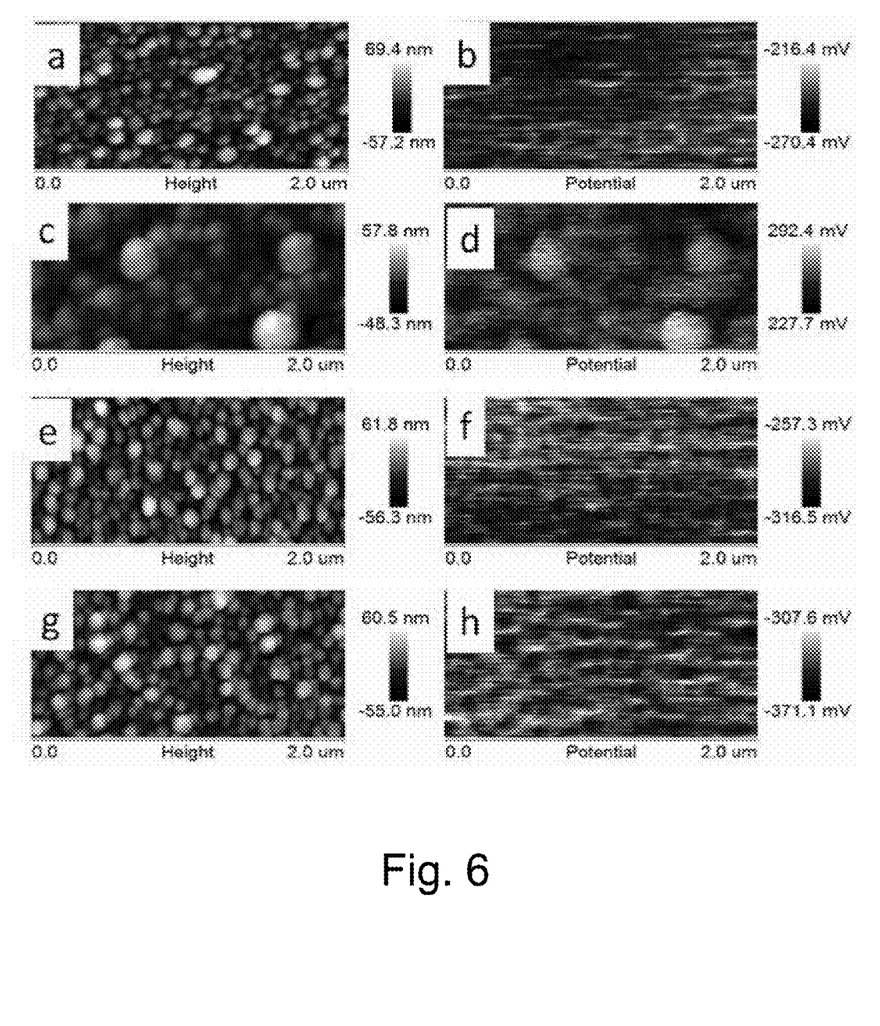
FIG. 6 is a schematic diagram illustrating a comparison of a field detection ability among other probes and the probe according to the present invention.

This local platinum silicide layer has been evidenced in its enhanced field detection ability through scanning Kelvin probe microscopy (SKPM), and the evidence may be seen in the surface potential scanning result in FIG. 6. In FIG. 6, figures (a) and (b) are SKPM diagrams obtained by pure silicon used in the prior art, figures (c) and (d) are SKPM diagrams obtained by the silicon probe tip covered by Pt—Ir used in the prior art, while figures (e) and (f) and (g) and (h) are SKPM diagrams obtained respectively from the silicon probe tip having been modified with the local platinum silicide layer after being annealed for 60 seconds and 90 seconds according to the present invention, respectively.

From a comparison among the SKPM diagrams associated with figures (a) through (h), it may be known that the present invention has the best resolution ability with respect to the nano-level material's surface potential. Since the local platinum silicide layer has a better surface field resolution ability as compared to the commercial probe or the probe without any modification, it is sufficiently evidenced that the implementation of the local platinum silicide layer formed between the platinum nano-structure and the silicon probe tip produces a better spatial resolution and sensitivity, largely enhancing the field detection resolution ability, lending itself to be well applicable onto the kind of conductive probes controllable and having a high spatial resolution.

In the present invention, the electro-coating template free deposition method, or the electron beam induced deposition (EBID) method is employed to enable the metallic precursor solution and the silicon probe tip to have a local electro-chemical reaction occurring therebetween, so that a local, selectable and precisely controllable platinum nano-structure deposition result may be achieved. Along with the atmospheric wave annealing process, the local platinum silicide layer is formed between the platinum nano-structure and the silicon probe tip, largely enhancing the conductivity of the tip and the field-detection spatial resolution ability, lending itself to be applicable onto the probe for a field sensitive scanning probe microscopic technology (FS-SPM).

In addition to exemption of stray-field and thus having an even better image quality, the probe tip containing the platinum silicide has an enhanced interfacial electrons transmission efficiency as compared to the probe tip having only the platinum nano-structure. Therefore, the tip structure of a platinum-platinum silicide-silicon composite field sensor probe used for field detection, and the method for forming a MSTA structure has the following advantages.

1. A low cost (may be finished by a home microwave furnace).

2. A short time (may be finished within two minutes).
3. Operated under the atmospheric condition.
4. A low temperature manufacturing process.
c. A high uniformity (controlled stably).
6. Maintained in the original probe tip profile.
7. The platinum silicide is formed at the interface, largely enhancing the conductivity.
8. The platinum is further fixed on the silicon substrate owing to the platinum silicide at the interface.
9. The field detection efficiency is largely enhanced.
10. Oxidation resistant and vulcanization resistant abilities are equipped, compared with the Ag tip.

In summary, the present invention is a tip structure of a platinum-platinum silicide-silicon composite field sensor probe used for field detection, and a method for forming a MSTA composed of the composite, which may effectively improve the disadvantages inherited in the prior art. More particularly, in such structure and method, a chemical deposition process is combined with a microwave annealing process, so as to form the local platinum silicide layer between the platinum nano-structure and the silicon probe tip, in which a good spacious resolution and sensitivity are equipped, which may largely enhance a conductivity of the tip and a spatial resolution of the field detection.

From all these views, the present invention may be deemed as being more effective, practical, useful for the consumer's demand, and thus may meet with the requirements for a patent.

The above described is merely examples and preferred embodiments of the present invention, and not exemplified to intend to limit the present invention. Any modifications and changes without departing from the scope of the spirit of the present invention are deemed as within the scope of the present invention. The scope of the present invention is to be interpreted with the scope as defined in the claims.

What is claimed is:

1. A method for forming a modified silicon tip apex (MSTA) structure on a platinum-platinum silicide-silicon composite field sensor probe, comprising steps of:
   (a) depositing a platinum nano-structure on a silicon probe tip,
   wherein step (a) further comprises the steps of:
   (a1) providing a metallic precursor solution mixed with fluorine ions; and
   (a2) controlling the silicon probe tip to be locally scanned on a substrate containing the metallic precursor solution, so as to restore a metal in the metallic precursor solution onto the silicon probe tip, and limit a size of the modified metal by using a particular surface structure of the substrate; and
   (b) heating the silicon probe by a micro-wave, so that a local platinum silicide layer is formed between the platinum nano-structure and the silicon probe tip.

2. The method for forming the MSTA structure of the platinum-platinum silicide-silicon composite field sensor probe as claimed in claim 1, wherein step (b) is performed by heating the silicon probe by the micro-wave under 1 atm to experience an atmospheric microwave annealing (a-MWA) process.

3. The method for forming the MSTA structure of the platinum-platinum silicide-silicon composite field sensor probe as claimed in claim 1, wherein step (b) is performed with a power of between 500 W and 1,800 W for a time between 60 seconds and 120 seconds.

4. The method for forming the MSTA structure of the platinum-platinum silicide-silicon composite field sensor probe as claimed in claim 1, wherein step (b) is performed by heating the silicon probe by the micro-wave with an intermission.

5. The method for forming the MSTA structure of the platinum-platinum silicide-silicon composite field sensor probe as claimed in claim 1, wherein step (b) is performed by heating the silicon probe by the micro-wave in a single fragmentation.

6. The method for forming the MSTA structure of the platinum-platinum silicide-silicon composite field sensor probe as claimed in claim 1, wherein the substrate has a plurality of holes for carrying the metallic precursor solution.

7. The method for forming the MSTA structure of the platinum-platinum silicide-silicon composite field sensor probe as claimed in claim 1, wherein the metallic precursor solution is composed of $H_2PtCl_6$ and a buffered oxide etchant (BOE).

8. The method for forming the MSTA structure of the platinum-platinum silicide-silicon composite field sensor probe as claimed in claim 1, wherein step (a2) is scanned for 5 seconds to 10 seconds in a tapping mode.

9. The method for forming the MSTA structure of the platinum-platinum silicide-silicon composite field sensor probe as claimed in claim 1, wherein step (a2) is performed by a localized fluoride assisted galvanic replacement reaction (LFAGRR) process.

* * * * *